United States Patent [19]

Callaghan et al.

[11] 4,345,673
[45] Aug. 24, 1982

[54] WHEEL BRAKE ARRANGEMENT

[75] Inventors: William I. Callaghan; Charles P. Ehinger, both of Mentor, Ohio

[73] Assignee: Towmotor Corporation, Mentor, Ohio

[21] Appl. No.: 201,092

[22] PCT Filed: Mar. 13, 1980

[86] PCT No.: PCT/US80/00269
§ 371 Date: Mar. 13, 1980
§ 102(e) Date: Mar. 13, 1980

[87] PCT Pub. No.: WO81/02550
PCT Pub. Date: Sep. 17, 1981

[51] Int. Cl.$^3$ .................... B60T 1/06; F16D 51/00
[52] U.S. Cl. ................... 188/18 R; 188/363
[58] Field of Search ............... 188/18 A, 18 R, 17, 188/72.4, 72.5, 331, 340, 341, 106 A, 362, 363, 364, 365, 325, 332, 333, 205 R, 206 R, 218 A

[56] References Cited

U.S. PATENT DOCUMENTS

| | | | |
|---|---|---|---|
| 2,796,954 | 6/1957 | Kaiser | 188/340 |
| 2,801,713 | 8/1957 | Trahern, Jr. | 188/363 X |
| 3,548,976 | 12/1970 | Dombeck | 188/340 |
| 3,779,348 | 12/1973 | Farr | 188/364 X |
| 3,980,347 | 9/1976 | Griesenbrock | 188/72.4 X |

Primary Examiner—Douglas C. Butler
Attorney, Agent, or Firm—Phillips, Moore, Weissenberger, Lempio & Majestic

[57] ABSTRACT

Backing plates are normally bolted to wheel gear housings and brake shoes are normally biased against such backing plates. Hydraulic or pneumatic lines normally proceed externally of the housing and over the backing plate to connect with a wheel cylinder which motivates the brake shoes. Such hydraulic lines can be easily damaged. A wheel brake arrangement (10) is disclosed which eliminates external hydraulic or pneumatic lines and eliminates such a backing plate. At least one conduit (33) is formed within a housing (12). The conduit (33) is connected directly to a wheel cylinder (28). The wheel cylinder (28) is mounted to one end (24) of the housing (12). A biasing structure (50) can serve for biasing a brake shoe (26) into contacting relation with one end (24) of the housing (12). A piloting arrangement (49) can serve for properly aligning the wheel cylinder (28) to motivate the brake shoe (26) and to receive pressurized fluid from the conduit (33).

9 Claims, 3 Drawing Figures

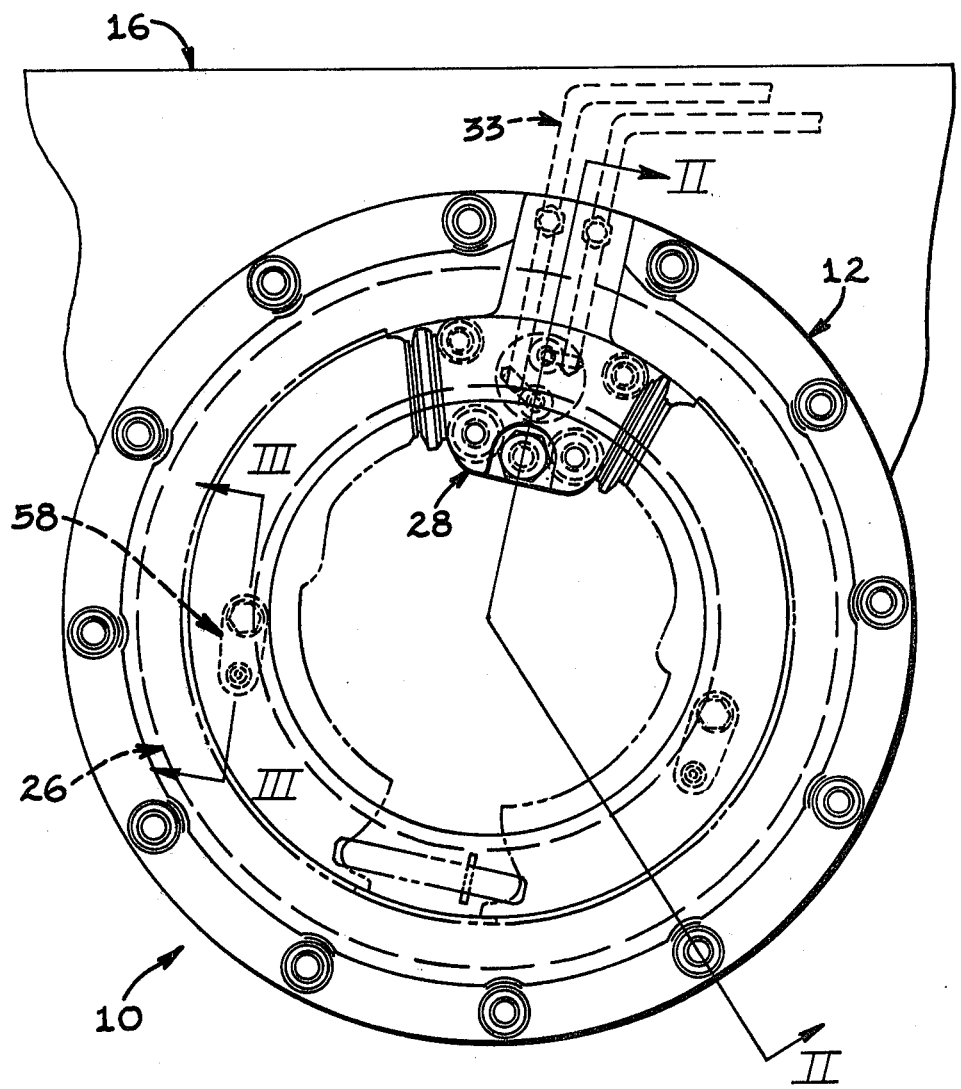

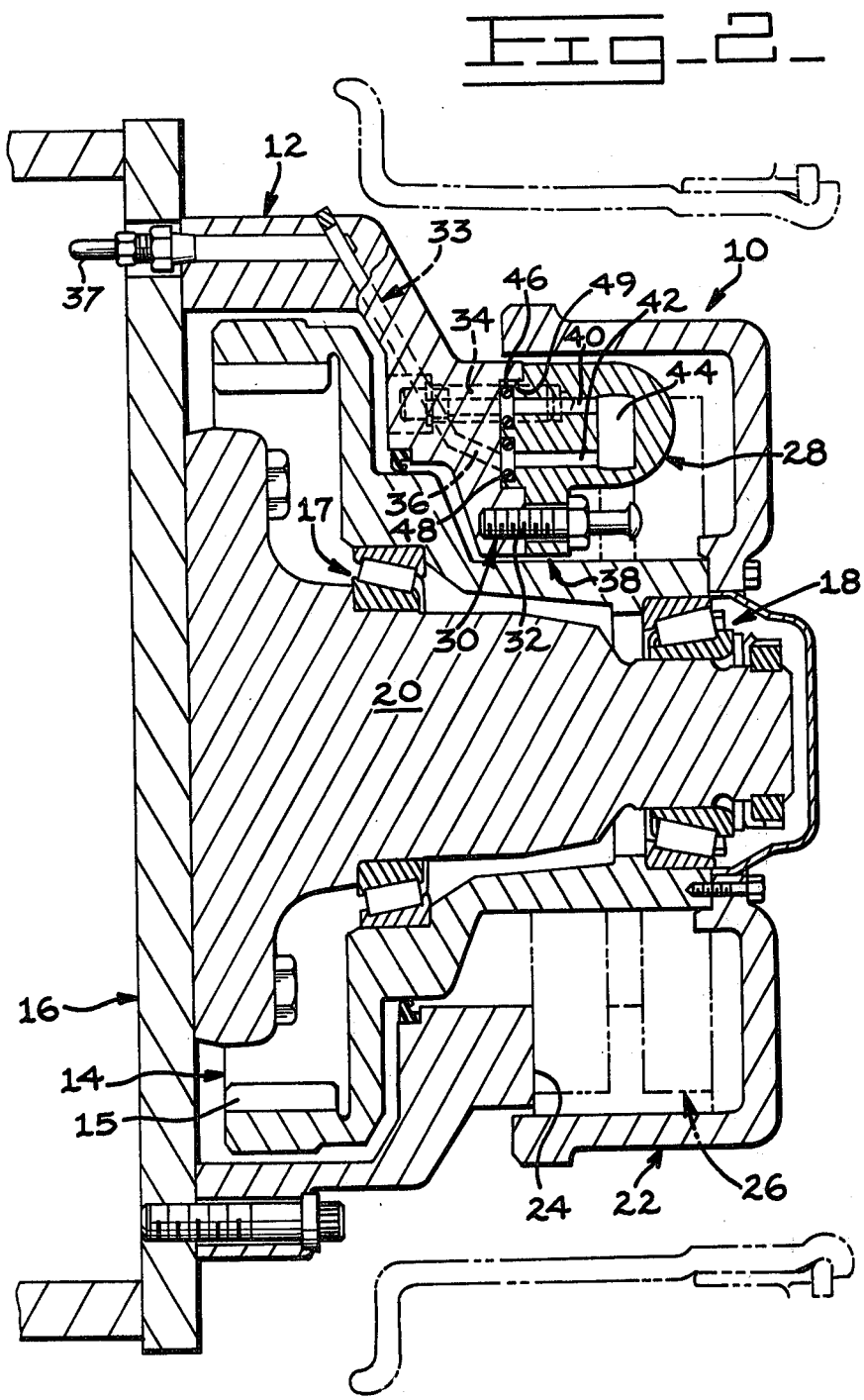

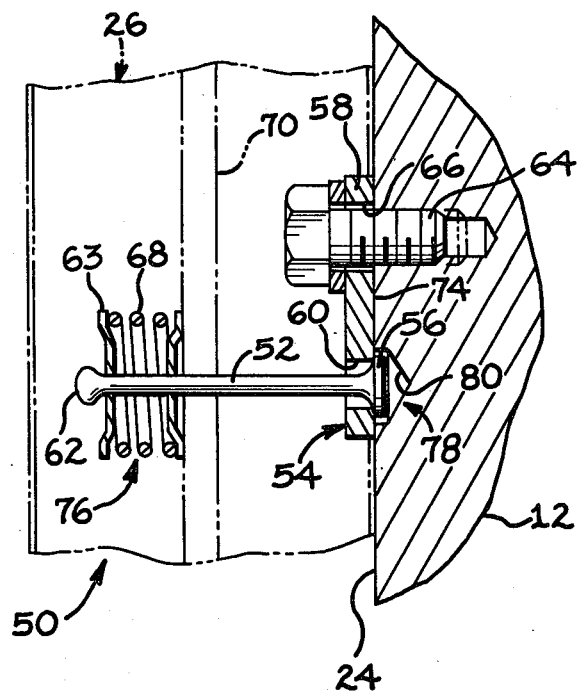

WHEEL BRAKE ARRANGEMENT

DESCRIPTION

Technical Field

This invention relates to a wheel brake arrangement for motivating a brake shoe into contact with a brake drum and for retaining the shoe in contacting relation with a housing of the wheel arrangement.

Background Art

There are a number of wheel brake arrangements which have a brake drum adjacent one end of a housing and at least one radially expandable brake shoe intermediate the housing and the drum. A wheel cylinder acts responsive to fluid pressure to motivate the shoe into frictional braking engagement with the drum.

In such prior art arrangements as described above, a backing plate is provided for the brake shoes, with the backing plate being connected to the housing. The wheel cylinder is attached to a side of the backing plate removed from the housing. Hydraulic lines extend from outside of the housing, pass over the backing plate, and are connected to the wheel cylinder. Thus, the lines are exposed outside of the frame and are subject to damage and leakage due to the compound bend angles necessary. Further, such lines are difficult to assemble to the wheel cylinder due to lack of space, particularly when a wheel gear is mounted on a hub or spindle within the housing. In addition, the backing plates are formed by an additional metal working step which adds to the overall expense of the integrated wheel brake arrangement.

Prior art backing plates are held against the brake shoes by spring retainers which include a pin having an enlarged end thereof positioned through a hole in the backing plate, with the large end of the pin being too large to pass through the hole. The pin is biased between the brake shoe and the backing plate so that the large end of the pin bears against the backing plate in a manner to produce a force which biases the brake shoe into contact with the backing plate. Such a spring retainer arrangement works well, but is difficult to assemble. That is, during assembly the pin can fall through the hole in the backing plate (which hole is large enough to admit all parts of the pin except for the enlarged end thereof). This is clearly undesirable and can lead to wasted time during assembly. Further, if the backing plate can be eliminated, thus saving expense and allowing elimination of exposed and easily damaged pressurized lines, a problem arises of providing a retainer for holding the brake shoes against the housing. The prior art does not attack such a problem.

The wheel cylinders of the prior art are generally mounted flatly against the backing plate. In such structures the wheel cylinder can be attached to the housing. If a backing plate is eliminated to save cost and eliminate potential damage to exposed pressurized lines, obtaining proper assembly of the wheel cylinder to the housing introduces yet another new problem not contemplated by the prior art.

The present invention is directed to overcoming one or more of the problems as set forth above.

Disclosure of Invention

In one aspect of the present invention, an improved wheel brake arrangement is provided having a frame, a housing adjacent the frame, a rotating member adjacent one end of the housing, at least one friction member intermediate the housing and the rotating member, and means for fluid pressurized motivating of the friction member into frictional engagement with the rotating member. The improvement of the arrangement comprises means for mounting the motivating means directly to the one end of the housing, at least one passage defined within the housing, means for connecting the passage with the motivating means and means for rigidly connecting the housing to the frame.

In another aspect of the present invention, the improvement in the wheel brake arrangement comprises means for rigidly connecting the housing to the frame and means for axially biasing the friction member into contacting relation with the one end of the housing.

It will be noted that a backing plate is completely eliminated in all aspects of the improvement and the pressurized fluid is introduced to the motivating means (the wheel cylinder) without its passing through any exposed lines external of the wheel gear housing. In one embodiment, the brake shoes are biased against the housing without possible loss of the pin. Thus, assembly problems are minimized and the possibility of line damage is eliminated.

BRIEF DESCRIPTION OF DRAWINGS

FIG. 1 is an end view of a wheel brake arrangement in accordance with an embodiment of the present invention;

FIG. 2 illustrates an enlarged view taken along the line II—II of FIG. 1; and

FIG. 3 illustrates an enlarged view taken along the line III—III of FIG. 1.

BEST MODE FOR CARRYING OUT THE INVENTION

Adverting primarily to FIG. 2, but also to FIG. 1, the invention relates to an improvement in a wheel brake arrangement 10. The wheel brake arrangement 10 may be of the type illustrated and have a wheel gear housing 12 which radially surrounds a wheel gear 14 conventionally driven by a pinion gear (not illustrated) at teeth 15. The pinion gear conventionally passes through an opening (not illustrated) in a frame 16. The housing 12 is rigidly attached to the frame 16. The wheel gear 14 is rotatably mounted at bearings 17,18 on a wheel spindle 20. A rotating spindle (axle) passing through the frame 16 can replace the wheel gear 14. A rotating member (brake drum) 22 is provided adjacent and generally spaced from one end 24 of the housing 12 and is secured to gear 14. The member 22 is conventionally mountable to a surrounding wheel hub (rim) as shown in phantom in FIG. 2. A pair of radially expandable friction members (brake shoes) 26 (shown in phantom in FIGS. 2 and 3) are located intermediate the housing 12 and the drum 24. A wheel cylinder 28 serves as means for hydraulically motivating the shoe 26 into frictional coupling engagement with the drum 22.

In accordance with the present invention, and as is seen in FIGS. 1 and 2, means 30, in the embodiment illustrated four bolts, only one of which, 32, is seen in FIG. 2, serves for mounting the wheel cylinder 28 to the one end 24 of the housing 12. A passage system 33, in the embodiment illustrated a pair of passages 34 and 36, is formed within the housing 12. The passage system 33 communicates with a master cylinder (not shown)

via a conduit 37 which is fully protected by the frame 16.

Means 38 are provided for connecting each of the passages 34,36 directly with the wheel cylinder 28. In the embodiment illustrated in FIG. 2, the aforementioned connecting means 38 comprises the bolting in place, via the bolts 32, of the wheel cylinder 28 to the one end 24 of the housing 12, along with a pair of passages 40,42 which connect respectively with the passages 34,36 and a control chamber 44 of the wheel cylinder 28. A pair of O-ring seals 46,48, respectively seal the connection between the passages 34 and 40 and the passages 36 and 42. One of the pair of passages 34 and 36 serves for pressurizing, and the other for bleeding the wheel cylinder 28 in a conventional manner. Although two passages 34 and 36 are illustrated, it should be recognized that a single passage can be, and often conventionally is only, provided for brake system pressurization. Thus, it is clear that there are no exposed hydraulic or pneumatic lines which are subject to breakage or which must be carefully aligned on assembly, since no lines are provided but instead only the passage system 33 in the housing 12. And, since the housing 12 is rigidly connected to the frame 16, no such somewhat flexible lines are needed to complete the passage system 33.

The wheel cylinder 28 fits in a piloting cavity 49 in the housing 12. Thus, when the wheel cylinder 28 is fitted into the piloting cavity 49 and the bolts 32 are put in place, the wheel cylinder 28 is properly positioned relative to the brake shoes 26, and importantly, means are provided to properly connect the passage 34 to the passage 40 and the passage 36 to the passage 42 at the O-ring seals 46 and 48. Proper alignment of the passages 34 and 36 with the passages 40 and 42 is thereby provided. Since the passage system 33 is completely within the housing 12, there are no exposed hydraulic or pneumatic lines to be damaged.

In order that the one end 24 of the housing 12 can effectively take the place of the conventional backing plate, it is necessary that the one end 24 of the housing 12 be relatively smooth surfaced so that the brake shoe 26 can be properly guided by sliding thereagainst and that the one end 24 have a large enough diameter to support the brake shoe 26.

Adverting now primarily to FIG. 3, there is illustrated therein means 50 for biasing each brake shoe 26 into contacting relation with the one end 24 of the housing 12. As will be seen, the biasing means 50 includes a pin 52 which is aligned generally perpendicular to the one end 24 of the housing 12. Means 54 are provided which serve for retaining a first end 56 of the pin 52 from moving axially outwardly (leftwardly in FIG. 3) relative to the one end 24 of the housing 12. The illustrated means 54, for retaining the first end 56 of the pin 52, is in the form of a plate 58 having a hole 60 therethrough, through which the pin 52 is received. The first end 56 of the pin 52, as illustrated, is too large to pass through the hole 60. A second end 62 of the pin 52 is sufficiently small to pass through the hole 60 to allow assembly of the overall biasing means 50. Although not illustrated because of its conventional nature, the second end 62 can be shaped to pass through a slot (not illustrated) in a washer 63 and then be rotated to a locking position where it will no longer be aligned with the slot and be able to pass through the slot.

Means, in the embodiment illustrated a bolt 64, which passes through an appropriate hole 66 in a portion of the plate 58 removed from the hole 60, serves for affixing the plate 58 in immovable relation to the housing 12 with the pin 52 in movable relation within the hole 60. A compression coil spring 68 acts between a web 70 of the brake shoe 26 and the washer 63, thereby biasing the shoe 26 into contact with the end surface 24 pulling the first end 56 of the pin 52 against a housing facing side 74 of the plate 58. Thus, the means 54 serves the desired purpose of retaining the first end 56 of the pin 52 from moving axially away from (outwardly relative to the one end 24 of) the housing 12.

The spring 68 and the washer 63, thus, serve as means 76 for biasing the second end 62 of the pin 52 against the brake shoe 26 in a direction to bias the brake shoe 26 against the one end 24 of the housing 12.

The brake shoe biasing means 50 also includes means 78 for retaining the first end 56 of the pin 52 from moving into (axially inwardly relative to the one end 24 of) the housing 12. In the embodiment illustrated, the retaining means 78 comprises a bore 80 which extends generally axially into the housing 12, but does not extend fully therethrough. Thus, the first end 56 of the pin 52 is held between the housing facing side 74 of the plate 58 and the bottom of the bore 80.

Assembly is simplified with the brake shoe biasing means 50 in that the pin 52 is held in position during assembly. Briefly, the first end 56 of the pin 52 is held in the bore 80 by the plate 58. This prevents the pin 52 from falling out during assembly. The pin 52 is then disposed in an aperture in the web 70. The spring 68 and washer 63 are then positioned over the second end 62 of the pin 52, as by making use of a slot in the washer 63.

Industrial Applicability

The invention operates to eliminate a backing plate between the housing 12 and the brake shoe 26. With the backing plate eliminated, it is possible to bring in hydraulic or pneumatic pressure through passages bored in the housing 12. This eliminates exposed lines and removes the problem of line connection on assembly. With the backing plate eliminated, means 50 are provided for axially biasing the brake shoe 26 into contacting relation with the one end 24 of the housing 12. A particularly advantageous biasing means 50 is disclosed which cannot fall out during assembly thereof, because of its unique design, particularly because of the means 78 which serves for retaining the first end 56 of the pin 52 of the biasing means 50 from axially moving inwardly relative to the one end 24 of the housing 12. A piloting cavity 49 is provided in the housing 12 for easy assembly and proper aligning of the passage system 30 with the wheel cylinder 28.

Other aspects, objectives, and advantages of this invention can be obtained from the study of the drawings, the disclosure and the appended claims.

We claim:

1. In a wheel brake arrangement (10) having a frame (16), a wheel gear housing (12) adjacent the frame (16), an annular rotating brake drum member (22) adjacent one end (24) of the wheel gear housing (12), the annular rotating drum member (22) being mountable to a surrounding wheel hub, a radially expandable brake shoe friction member (26) intermediate the wheel gear housing (12) and the rotating brake drum member (22) and means (28) for fluid pressure motivating of the friction brake shoe member (26) to expand radially into frictional engagement with the rotating brake drum member (22), the improvement comprising:

means (30) for mounting said motivating means (28) in abutting relation directly to said one end of said wheel gear housing (12) without the interposition of a backing plate between said motivating means (28) and said wheel gear housing (12);

said wheel gear housing (12) defining a passage (33);

means for rigidly connecting the wheel gear housing (12) to the frame (16); and means (38) for connecting said passage (33) with said motivating means (28).

2. An improvement in accordance with claim 1, further including:

means (50) for axially biasing said friction brake shoe member (26) into direct contacting relation with said one end (24) of said wheel gear housing (12).

3. The improvement in accordance with claim 2, wherein said biasing means (50) has:

a pin (52) aligned generally perpendicular to said one end (24) of said housing (12);

means (54) for retaining a first end (56) of said pin (52) from moving axially away from said housing (12);

means (76) for biasing a second end (62) of said pin (52) against said friction brake shoe member (26) and in a direction for biasing said friction brake shoe member (26) against said one end (24) of said housing (12); and means (78) for retaining said first end (56) of said pin (52) from moving axially into said housing (12).

4. The improvement in accordance with claim 1, including:

means for aligning the motivating means (28) with said passage (33).

5. In a wheel brake arrangement (10) having a wheel gear housing (12) having one end (24), an annular rotating brake drum member (22) adjacent said one end (24) of the wheel gear housing (12), a radially expandable brake shoe friction member (26) intermediate the wheel gear housing (12) and the rotating brake drum member (22) and means (28) for fluid pressure motivating of said friction brake shoe member (26) to expand radially into frictional engagement with said rotating brake drum member (22), the improvement comprising:

means for rigidly connecting the wheel gear housing (12) to the frame (16); and means (50) for biasing said friction brake shoe member (26) into direct contacting relationship with said one end (24) of said wheel gear housing (12) without the interposition of a backing plate between said motivating means (28) and said wheel gear housing (12).

6. The improvement in accordance with claim 5, wherein said biasing means (50) has:

a pin (52) aligned generally perpendicular to said one end (24) of said wheel gear housing (12);

means (54) for retaining a first end (56) of said pin (52) from moving axially outwardly relative to said one end (24) of said wheel gear housing (12);

means (76) for biasing a second end (62) of said pin (52) against said friction brake shoe member (26) and in a direction for biasing said friction brake shoe member (26) against said one end (24) of said wheel gear housing (12); and means (78) for retaining said first end (56) of said pin (52) from moving axially inwardly relative to said one end (24), of said wheel gear housing (12).

7. The improvement in accordance with claim 6, wherein said inward movement retaining means (78) is a bore (80) which extends generally axially into said wheel gear housing (12) but does not extend therethrough.

8. In a wheel brake arrangement (10) having a frame (16), a housing (12) having one end (24), a rotating member (22) adjacent said one end (24) of the housing (12), a friction member (26) intermediate the housing (12) and the rotating member (22), and means (28) for fluid pressure motivating of the friction member (26) into frictional engagement with the rotating member (22), the improvement comprising:

means for rigidly connecting the housing (12) to the frame (16);

a pin (52) aligned generally perpendicular to said one end (24) of said housing (12), the pin (52) having a first end (56) and a second end (62);

a plate (58) having a hole (60) therethrough through which said pin (52) fits, said first end (56) of said pin (52) being too large to pass through said hole (60) and said second end (62) of said pin (52) being sufficiently small to pass through said hole (60);

means (64, 66) for affixing said plate (58) in immovable relation to said housing (12) with said pin (52) in movable relation within said hole (60);

means (76) for biasing said second end (62) of said pin (52) against said friction member (26) against said one end (24) of said housing (12); and means (78) for retaining said first end (56) of said pin (52) from moving axially inwardly relative to said one end (24) of said housing (12).

9. In a wheel brake arrangement (10) having a frame (16), a wheel gear housing (12) adjacent the frame (16), a rotating brake member (22) adjacent one end (24) of the wheel gear housing (12), the rotating brake member (22) being adapted to brake a wheel hub, a brake shoe friction member (26) intermediate the wheel gear housing (12) and the rotating brake member (22) and means (28) for fluid pressure motivating of the brake shoe friction member (26) to move into frictional engagement with the rotating brake member (22), the improvement comprising:

means (30) for mounting said motivating means (28) in abutting relation directly to said one end of said wheel gear housing (12) without the interposition of a backing plate between said motivating means (28) and said wheel gear housing (12);

said wheel gear housing (12) defining a passage (33);

means for rigidly connecting the wheel gear housing (12) to the frame (16); and means (38) for connecting said passage (33) with said motivating means (28).

* * * * *